Patented Aug. 13, 1929.

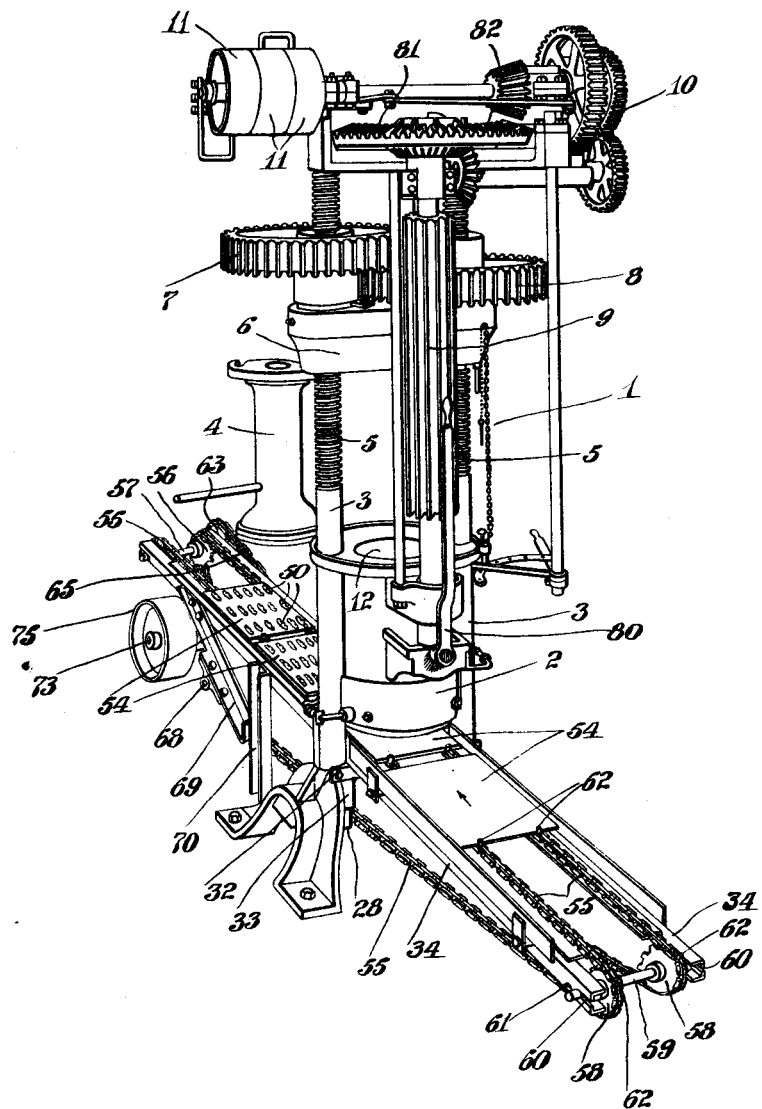

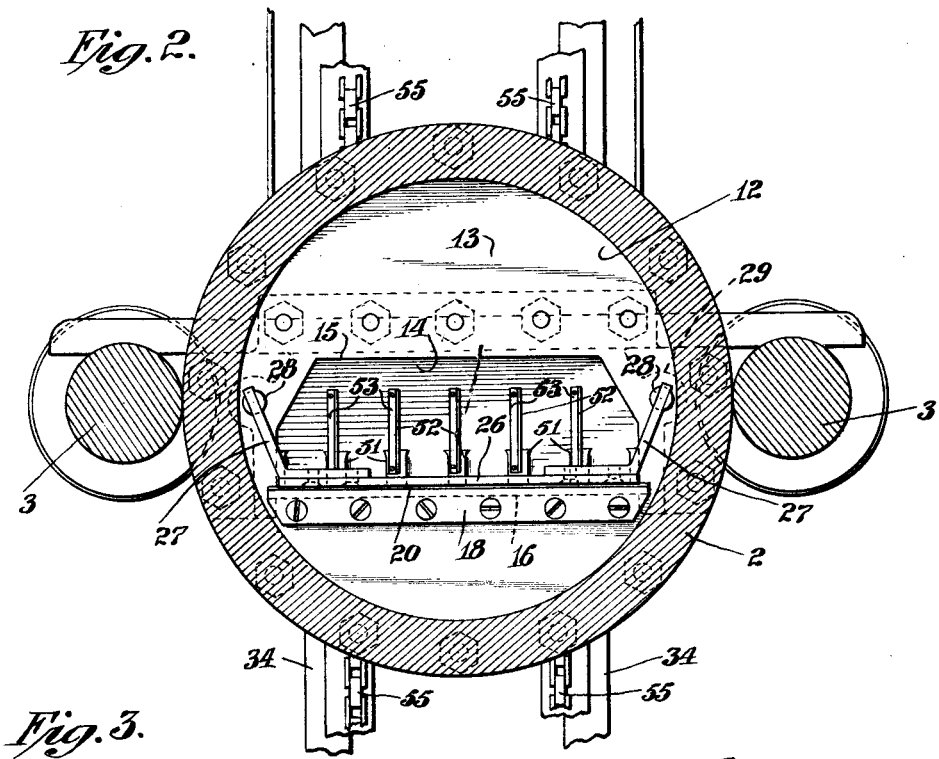
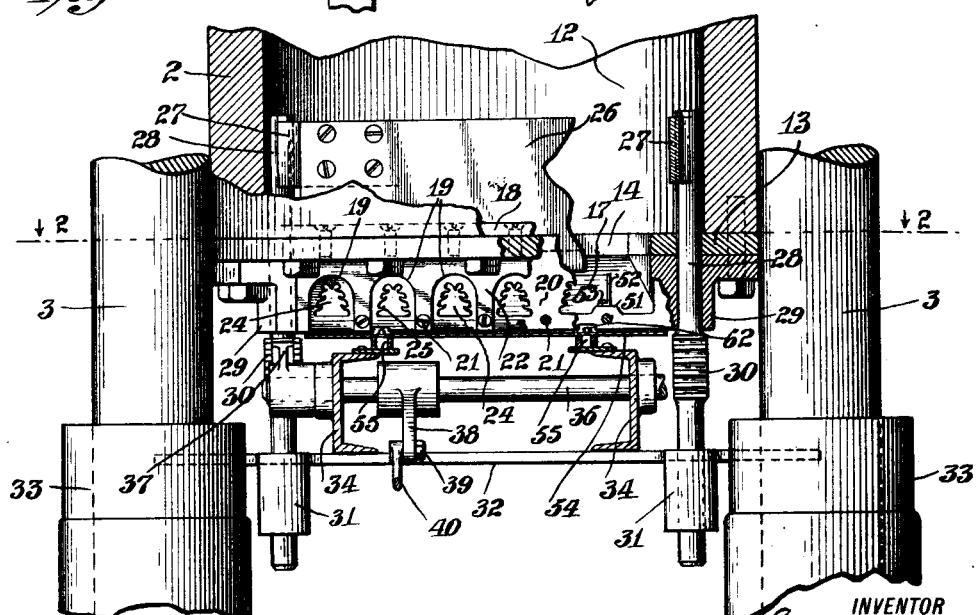

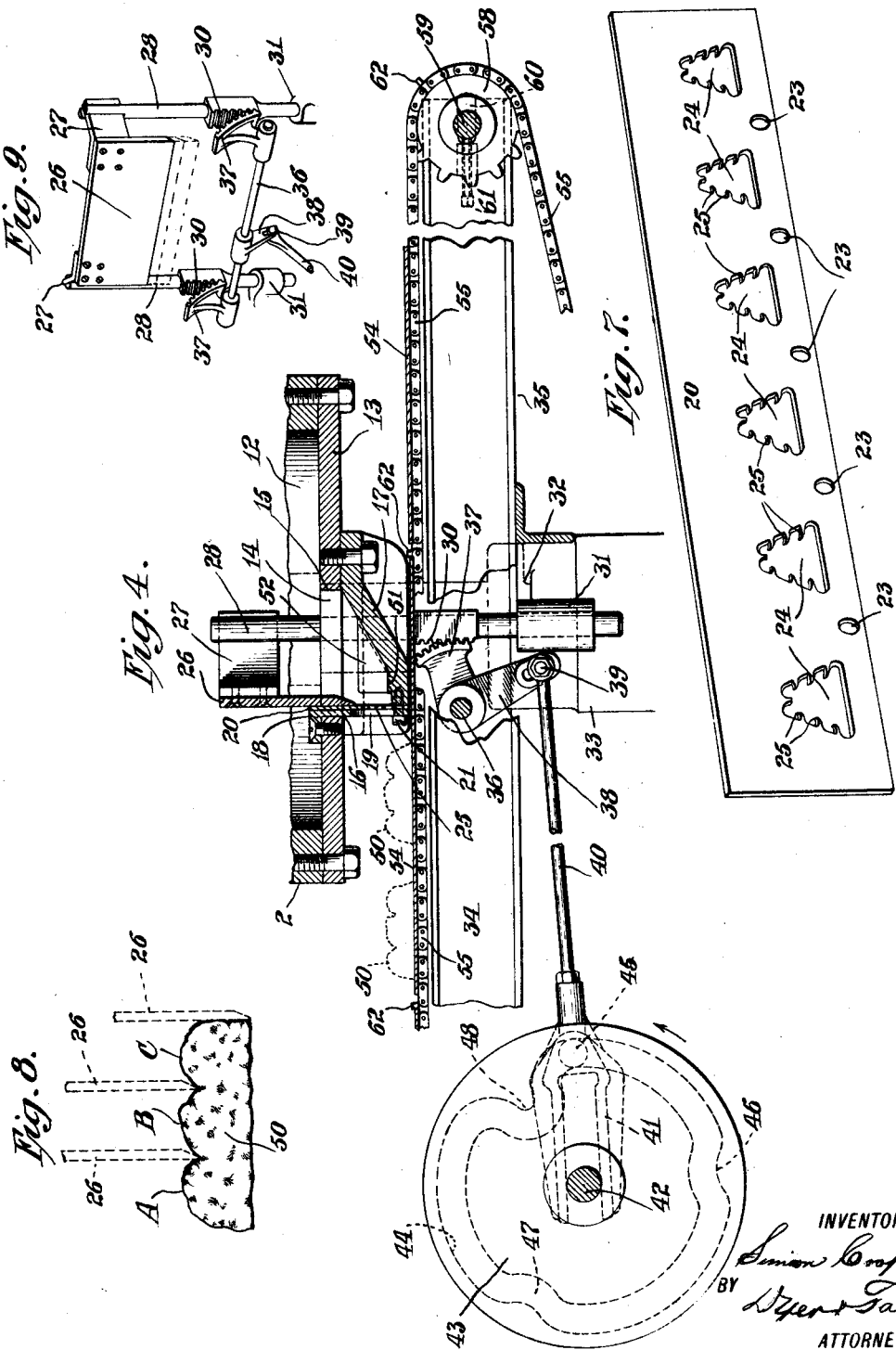

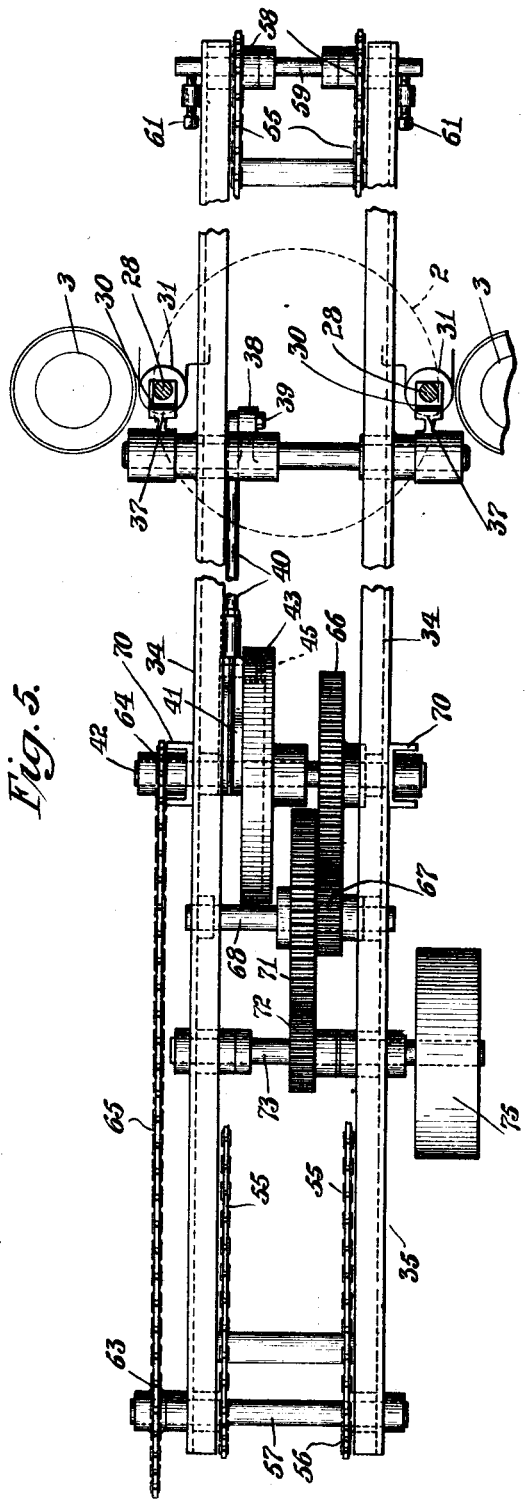
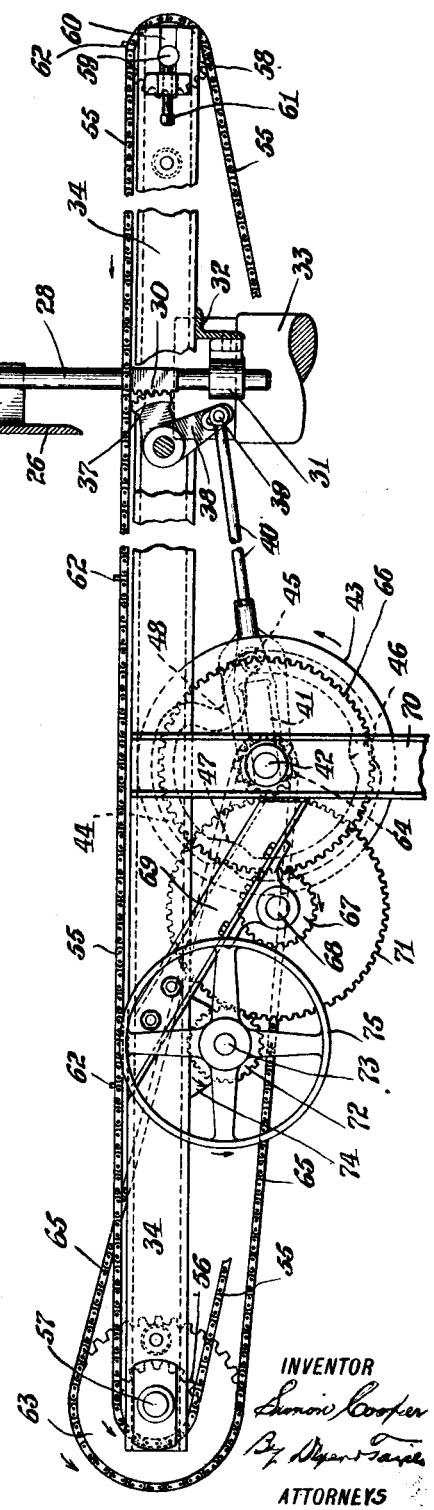
Fig. 5.
Fig. 6.

1,724,563

UNITED STATES PATENT OFFICE.

SIMON COOPER, OF BROOKLYN, NEW YORK, ASSIGNOR TO MASON, AU & MAGENHEIMER CONFECTIONERY MANUFACTURING COMPANY, OF BROOKLYN, NEW YORK, A CORPORATION OF VIRGINIA.

METHOD FOR FORMING CONFECTIONS AND MACHINE FOR CARRYING OUT SUCH METHOD.

Application filed May 4, 1921. Serial No. 466,844.

This invention relates to the method for forming candy centers or candies in general and more especially to the method for forming candies such as cocoanut confections and to machines for carrying out such method.

Among the objects of the invention it is aimed to provide a method for conveniently and expeditiously forming candies in large quantities by machinery, and to provide a method for conveniently and rapidly forming in large quantities, candies irregular in shape and of the general composition such as that of cocoanut confections or confections having fibered nut ingredients.

In the candy or confectionery manufacturing industry, great difficulty has been encountered in forming expeditiously, in large quantities, products having in their formation state the constituency or composition of a semi-fluid mass containing more or less coarse components such as are found in a mass containing cocoanut shreds or the like. Furthermore it has been particularly difficult with such masses to produce shapes other than the conventional regular shapes. Especially has this been the case when it was sought to produce a more or less fluffy texture for the resulting product. With these difficulties in mind the present invention aims to provide a method and the machinery for carrying out such method whereby these difficulties may be effectively overcome.

Specifically the invention contemplates a method and the machinery for carrying out such method whereby a cocoanut confection may be produced having a fluffy texture, and an irregular outer contour approximating a plurality of protrusions or the like. To this end, the invention contemplates the gradual feeding of a mass of plastic material, the discharge of such mass through dies formed according to the shape of product to be produced, the nicking of the discharging mass to produce intermittent depressions and the consequent intermittent protrusions or the like, and the severing of the discharging mass to produce predetermined units.

Specifically, the invention may also be considered as contemplating the use of a so-called macaroni machine for gradually feeding a semi-fluid mass or plastic material in a vertical direction, the use of a plurality of die openings discharging horizontally and shaped according to the shape of product to be produced, the use of knives or the like for co-operating with such die openings to nick the discharging streams to form intermittent protrusions, and also to sever the discharging streams into predetermined units.

These and other features, capabilities and advantages of the method constituting part of the subject matter of this invention will appear from the sub-joined detail description of one specific embodiment of the machine for carrying out this invention, also forming a part of the subject matter of this invention, illustrated in the accompanying drawings in which Figure 1 is a perspective view of the complete machine.

Fig. 2 is a plan partly in section along the line 2—2 of Fig. 3.

Fig. 3 is a vertical view partly in section of the forming mechanism.

Fig. 4 is a side view partly in section showing in detail the forming mechanism control and the receiving conveyor.

Fig. 5 is a plan of the receiving conveyor including the cam mechanism and gearing.

Fig. 6 is a side view of the parts shown in Fig. 5.

Fig. 7 is a perspective view of the die plate constituting part of the forming mechanism.

Fig. 8 is a perspective view of an article produced by the machine; and

Fig. 9 is a perspective showing the knife in detail.

In the embodiment illustrated a feeding mechanism is shown which in the present instance comprises a typical screw-geared press 1, such as used for making macaroni and the like, having a cylinder 2, fixed on uprights 3, and a piston 4, for reciprocating vertically in the cylinder 2. The standards or uprights 3 are threaded at 5 above the cylinder 2, and passed through the yoke 6 on opposite sides thereof. The yoke 6 is secured thereto in the usual way. The gears 7 and 8 which are screw threadedly connected with the threaded portions 5 of the standards 3, mesh with the elongated pinion 9. The pinion 9 is connected by the train of gears 10 to the driving pulleys 11 whereby the pinion 9 may be actuated either to lower the yoke 6 or to raise the same in the usual way. The piston 4 as shown is pivotally connected to the yoke 6 so that it may be swung out of alinement with the bore 12 of the cylinder 2 in order to facilitate supplying the cylinder 2 with the plastic material to be expressed therefrom. When the press is ready for expressing plastic material, the piston 4 is swung into alinement with the bore 12 and anchored to the yoke 6, whereupon the driving mechanism may be started to lower the yoke 6 and therewith the piston 4 to express the plastic material from the lower end of the cylinder 2 through the particular forming mechanism now to be described and which forms the main part of the present invention.

At the lower end of the cylinder 2 there is secured a plate 13 having an elongated opening 14 (see Figs. 2 and 4). This opening 14, as particularly shown in Fig. 2, is preferably provided with a short side 15 having outwardly flaring ends and a long side 16. To the lower side of the plate 13, there is secured a trough 17 inclining downwardly from the short side 15 of the opening 14 and terminating below the level of the plate 13 and at a distance spaced from the long side 16 to form a mouth for the trough and consequently for the cylinder 2. Facing the side 16 there is secured an angle piece 18 extending downwardly and connected to the free edge of the trough. This angle plate is provided with a plurality of openings 19 preferably corresponding in number to the number of openings in the die plate about to be described, and also preferably corresponding somewhat to the shape of the die openings of such die plate.

In the present instance the die plate 20 is secured in place between the angle piece 18 and the edge of the trough 17 by any suitable means such as the screws 21 passing through the lower ends of the limbs 22 of the angle piece 18, disposed between the openings 19, then through the orifices 23 of the die plate 20 and into the edge of the trough 17. The die plate 20 is provided with the die openings 24 (see Figs. 3 and 7), which register with the openings 19 of the angle piece 18. It will thus be seen that the angle piece 18 serves as a facing and a reinforcement for the die plate 20. The openings 24 obviously may be of various shapes and conformations, according to the shapes of confection to be produced, and furthermore, the die plate 20 may obviously vary in thickness, according to the shape of confection to be produced. In the present instance it is a specific aim of the invention to produce a confection that is somewhat fluffy in texture, and has cone-shaped protrusions, having an irregular shredded outer contour. To this end it has been found that a thin die plate co-operating with serrations formed on the edge of the die openings serve best to produce the desired result. The openings for this purpose are somewhat pyramidal in form and serrated on its two inclined sides to form a plurality of teeth 25, on such sides. It has been found that plastic material of the constituency aforesaid, when pressed through a die plate formed as aforesaid, will tend to cling to the teeth, and as it passes the teeth will tend to resume its former shape thereby springing outwardly, simultaneously and incidentally tending to expand, to produce not only a somewhat fluffy texture for the resulting confection but also to form cone-shaped protrusions, irregular and shredded in outer contour.

One of the objects of this invention is to provide a method and the machine for carrying out such method whereby a cocoanut confection may be produced having a fluffy texture and an irregular shredded outer contour. To this end in expressing or extruding the material through the die plate, it has been found desirable to actuate the piston 4 to descend gradually without interruption. The speed of travel of the piston obviously must be regulated according to the dimensions of the relative parts of the machine and the composition of the substance to be expressed. With plastic material for forming a confection having substantially one-third cocoanut, one-third cream, and the remainder sugar and other flavoring components, and such like semi-fluid plastic material, and a machine having a cylindrical bore eighteen inches in diameter, and die openings aggregating about six square inches, the best results have been obtained when the rate of speed of the piston does not exceed one inch in descent every one minute. Obviously if this fluffy texture is not an aim with the product to be produced, the rate of speed may be materially changed. As an instance it has been found that when the speed is materially increased, a very compact piece of confection may readily be produced.

For co-operating with the die plate there is provided a knife 26 which functions both as a forming and severing member. This knife is preferably elongated and corresponds in length substantially to the length of the die plate so as to simultaneously co-operate with all of the streams extruded from the plurality of die openings 24. This knife is disposed to travel along the inner face of the die plate 20, as shown in Fig. 4, and to this end, it is secured to angular brackets 27, the limbs of which brackets are fixed to the rods 28, which are slidably mounted in the plate 13 and the enlargements 29 formed on the trough member 17. Below the enlargements 29 the rods are provided with the racks 30, below which racks 30 the rods are slidably mounted in the enlargements 31 formed on the cross piece 32 which in turn is supported by the base members 33 of the standards 3.

The knife 26 aforesaid embraces substantially a metal plate having its lower edge formed into a cutting edge by cutting away a portion of the plate on the side which is removed from the die plate so that it inclines and tapers into a cutting edge in line with the die plate 20. By this arrangement, the outer face of the knife 26 is flush with the die plate 20 and may be caused to slide in intimate contact with the die plate, so that after the knife has either nicked or sheared the plastic material, it will be cleaned and freed by the die plate 20, from any of the plastic material that might otherwise cling to it. The edges of the die openings 24 serve as scrapers for this purpose.

Supported by the rails 34 of the main frame 35 below the trough 17, (Figs. 3 and 4), there is journalled a shaft 36 to which are fixed the segments 37 in mesh with the racks 30. Fixed to the shaft 36 there is also provided a lever 38, the free end of which has a slot therein for receiving the pin 39 of the connecting rod 40. The connecting rod 40 has a yoke 41 straddling the shaft 42, which has fastened thereto the track cam 43, in the track 44 of which travels the stud roller 45, fixed to the connecting rod 40. The track 44 has two short shallow rises 46 and 47, and a longer and deeper rise 48. By this arrangement the rotation of the track cam 43 will actuate the connecting rod 40, in turn to actuate the lever 38, segments 37 and racks 30, thereby to cause the rods 28 to be retained inactive when the roller 45 is disposed in the intermediate passages of the track 44 between the rises, 46, 47 and 48, or to be actuated a greater or less distance according to the rise engaged.

When roller 45 engages the intermediate passages of the track 44 between the rises, the cutting edge of the knife 26 will be disposed above the upper ends of the openings 24 of the die plate 20. The roller 45 will engage the shallow rises 46 and 47 successively relative to the rise 48 and in the course of this operation, the knife will be caused by engagement with the rise 46 to descend below the upper ends of the openings 24 to approximately one-third the distance of the height of the openings 24, then return above the upper edges of the openings as the roller re-engages an intermediate passage between the rises, again descend such one-third distance as the roller engages the rise 47, again return above the upper edges of the openings 24 as the roller again re-engages an intermediate passage, and then descend practically the full height of the openings 24 to cause a severing operation to take place upon the plastic material extruding from the die openings 24.

In other words, the knife 26 in its operation is intended to serve two different functions, one a so-called nicking function, and the other a severing function. Thus, when it is desired to produce, as is one of the objects of the machine forming part of the present invention, a confection having a plurality of depressions with the resulting protrusions, in the present instance, the plastic material will be caused to extrude from the die openings 24 after the knife has been raised from its closed position corresponding to the severing positions when the roller 45 engages the deep rise 48. The material will extrude until the roller engages the rise 46 whereupon the knife will descend one-third the distance of the openings 24 to nick the plastic material (see Fig. 8), and form the protrusion A of the piece of confection 50 to be produced. As the knife again rises with the engagement of the roller 45 in an intermediate passage of the track 44 on its way to the rise 47, the plastic material will continue to extrude until and while the knife again descends one-third the distance, upon the engagement of the roller 45 in the rise 47 to form the protrusion B. Thereupon the knife will again rise, while the plastic material still continues to extrude, until the roller again engages the rise 48 whereupon the knife will descend the full distance of the openings 24 to perform a severing operation and incidentally to form a third protrusion C, the rise 48 permitting a sufficient dwell so that the severance will be effective to define and separate the successive series of units to be produced. It is, of course, understood that there will be as many units in a series to be produced as there are die openings 24.

Provision is made to take care of any compression that would occur when the knife is disposed in its descended position where it completely closes the die openings, the piston 4 continuing in its descent during this closing position of the knife. This provision resides in the unique disposal and operation of the rods 28, brackets 27 and knife 26. The rods 28, brackets 27 and knife 26 travel in the plastic mass disposed in the cylinder 2 from which it is being extruded. When the knife descends to its lowermost position the rods 28, brackets 27 and knife 26 will descend so that a portion of the rods 28 and of the knife 26 will protrude from the cylinder 2 and thus vacate a space in the cylinder previously occupied by such protruding portions, with the consequent relief in pressure upon the plastic material contained in the cylinder 2. Obviously for different sized cylinders, the dimension of the rods and appurtenant parts will have to be predetermined to produce the best results in this respect.

On the upper or inner surface of the trough 17 there are provided a plurality of reinforcing ribs 51, which are preferably disposed in alinement with the limbs 22 of the angle piece 18, so that these ribs not only serve as reinforcements for the trough 17, but also as convenient bases to which may be secured guiding plates 52, the guiding plates having flanges 53 which may be secured to the ribs 51 by any suitable securing means.

These guiding plates 52 preferably extend substantially perpendicular relative to the trough 17 and are provided to serve as adjustable regulating means for equalizing the flow of material through the die openings 24. When, according to the composition of the plastic material being extruded and the operation of the machine, it is found that the flow from one or another of the die openings differs in speed relative to one another, the guiding plates 52 which are preferably of some suitable flexible material, may be deflected toward or away from the particular die openings causing trouble, according as the flow is greater or less in speed than that from the other die openings. By this means the flow from the several die openings may be conveniently and speedily regulated.

For receiving the extruded plastic material and consequently the severed units, a plurality of trays 54 are provided to travel below the trough 17 and beyond the die openings 24 forming part of a suitable conveyor now to be described.

The conveyor comprises essentially a pair of conveyor chains 55 travelling at one end over the pair of sprockets 56 fastened upon the shaft 57 supported by the rails 34 of the main frame. At the other end of the rails 34 the conveyor chains travel over the sprockets 58 fixed on the shaft 59, which is adjustably mounted in the slots 60 formed in the ends of the rails 34. Take-up bolts 61 are suitably secured to the ends of said rails 34 to cooperate with the shaft 59 to facilitate adjusting such shaft to maintain the conveyor chains 55 as taut as may be desired. On the conveyor chains 55 suitably spaced from one another are provided the lugs 62, so spaced from one another relative to the length of the trays 54, as particularly shown in Figs. 1 and 4, as to form a very slight space between the advance edges of the trays 54 and the lugs 62 as may be desired to facilitate manipulating such trays in the course of placing them on the conveyor chains and removing them therefrom.

For driving the conveyor chains a suitable sprocket 63 is fixed to the shaft 57 which is connected to the sprocket 64 on the shaft 42 by the sprocket chain 65. The shaft 42 also has affixed thereto a gear 66 meshing with the pinion 67 on the shaft 68 journalled in the arms 69 secured to the rails 34 and standards 70 also secured to the rails 34. On the shaft 68 another large gear 71 is fixed which meshes with the pinion 72 on the shaft 73 journalled in the brackets 74 secured to the rails 34. On the shaft 73 is fixed the drive pulley 75 which may be connected to a suitable source of power by belting.

From the foregoing it will be seen that the track cam 43 fixed to the shaft 42 will be driven from the same source of power by which the conveyor chains 55 are driven. The timing of the various elements of course is an important part but it will be sufficient here merely to mention that the conveyor chains are driven at a rate of speed conforming to the rate of speed at which the material is being extruded from the die openings 24, and that the lugs 62 are positioned on the conveyor chains—and consequently the divisions between the successive trays 54 are positioned—so that the severance of a series of units will take place just immediately before a set of lugs registers with the die openings 24 so that the material may not be discharged while the division of the plates registers with the die openings.

It will also be sufficient here to say that the length of the trays is pre-determined so as to accommodate and receive a predetermined number of series of units.

The ends of the conveyor, in the present instance, are unobstructed so that they might readily lend themselves either to placing and removing the trays on to the conveyor chains by hand, or to couple thereto suitable loading and removing conveyors well known in the art.

In the course of operation the yoke 6 and the thereto connected piston 4 will descend to extrude the plastic material through the die openings 24. This descent is accomplished by means of the gears 7 and 8, the pinion 9, the train of gears 10 and one of the pulleys 11 connected to a suitable source of power, not shown. When the piston 4 approaches its lowermost position in the cylinder 2, the train of gears 10 is reversed in the usual way to cause the piston 4 to rise. When the piston has ascended to clear the cylinder 2 as shown in Fig. 1, the driving mechanism will be stopped to anchor the piston against further upward movement whereby the piston may be swung out of alinement with the bore of the cylinder 2 and permit placing a fresh supply in the cylinder.

As is usual with the ordinary macaroni machine, so with this machine, in its upward movement the pinion 9 may be raised by means of the lever 80 to bring the bevel gear 81 into mesh with the bevel pinion 82 and thereby shut out the reduction train of gearing for the purpose of expediting the return or ascent of the piston 4.

From the foregoing it will be seen that the steps in the method constituting part of the present invention reside principally in extruding plastic material from the cylinder 2 through the die openings 24; in subjecting the plastic material to certain pressure while it is being extruded; in relieving such pressure when the die openings are shut by means of the displacement afforded by the descent of the rods 28; in forming a fluffy texture to the resulting confection being produced by extruding the material through a comparatively thin die plate having serrated edges to which the extruded material will cling and which will lend themselves to facilitate the sudden expansion or release of the material as it passes the serrated edges; in forming conical-shaped protrusions on the confections being produced with an irregular contour by means of the serrated die openings; in forming a confection having a plurality of successive protrusions by means of the nicking and severing operation of the knife 26; in supplying units to a plurality of successive trays; and in the timing of the severing operation of the knife with the positioning of the trays upon the conveyor chains, and with the rate of speed of the conveyor chains, so as to facilitate the proper reception of the plurality of rows of pieces of confection, by the successive trays. It will also be noted that since the conveyor is continually advancing while the knife is reciprocating to cause the successive depressions and severances, the conveyor will not only cooperate with the knife to form decidedly V-shaped depressions and decidedly rounded protrusions on the units of confection, but will also cooperate with the serrated die openings to aid the tearing and curling operation.

It is obvious that various changes and modifications may be made in the steps of the method and in the details of the embodiment of the machine illustrated for carrying out this method without departing from the general spirit of the invention set forth in the claims appended hereto.

I claim:

1. The method of forming confections of the class described consisting in feeding plastic material through a cylinder, extruding such plastic material from the cylinder in a plurality of streams, imparting to said streams while they extrude an irregular outer contour, nicking certain parts of said streams and severing other parts of said streams to form units having a plurality of successive protrusions.

2. The method of forming confections of the class described consisting in extruding plastic material from a cylinder in a plurality of streams, causing said streams as they extrude to form a fluffy texture, imparting to said streams while they extrude an irregular outer contour, and successively nicking and severing said streams to form units having a plurality of successive protrusions.

3. The method of forming confections of the class described consisting in slowly extruding a stream of plastic material containing fibrous particles under slight pressure from a cylinder, engaging parts of the surface of the stream to tear it open and thereby cause it to open to form a fluffy texture, and imparting an irregular contour to said stream.

4. The method of forming confections of the class described consisting in slowly extruding a stream of plastic material containing fibrous particles under slight pressure from a cylinder, and engaging parts of the surface of the stream to tear it open and thereby cause it to open and form a fluffy texture.

5. The method of forming confections of the class described consisting in slowly extruding a stream of plastic material containing fibrous particles from a cylinder, engaging parts of the surface of the stream to tear it open and thereby cause it to open and form a fluffy texture.

6. The method of forming a confection of the class described, consisting in extruding a stream of plastic material, imparting a drawing action to said stream as it is extruded, depressing certain parts of one surface of the stream being extruded, and severing other parts of the stream as it is being extruded to form units each having a plurality of successive protrusions.

7. The method of forming confections having plain bottoms and upwardly extending protrusions defined by depressions, consisting in feeding plastic material through a container, discharging such plastic material from said container in a plurality of units, and subjecting each unit while being discharged to several operations, one operation including the formation of a plain bottom and another operation including the formation of the depressions defining the upwardly extending protrusions.

8. The method of forming a confection of the class described, consisting in extruding a stream of plastic material, imparting a drawing action on said stream to advance the same after it has been extruded, causing a knife to reciprocate into engagement with one surface of certain parts of the stream while it is being drawn and extruded to form substantially V-shaped depressions and substantially rounded protrusions, and causing the knife to sever the stream at other parts to form units each having a plurality of protrusions.

9. The method of forming confections of the class described consisting in imparting an irregular contour to a stream of plastic material containing fibrous particles, hooking into the material to tear it open to form a fluffy texture, and severing said stream into units.

10. The method of forming confections of the class described, each having a plane lower surface, consisting in nicking certain parts of the upper surface of a plurality of streams to form a plurality of protrusions, severing other parts of said plurality of streams to form units, receiving said units on trays as they are being severed, and successively conveying said trays into position to receive said units and out of such position after having so received said units, while the streams are being nicked and severed so that a drawing action is imparted to the streams thereby to cause the formation of substantially V-shaped depressions and substantially rounded protrusions on the units.

11. The method of forming confections of the class described consisting in extruding plastic material from a cylinder by pressure through a plurality of die openings, intermittently closing said die openings to sever said plastic material into units, and relieving the excess pressure in said cylinder while said die openings are being closed.

12. The method of forming confections of the class described consisting in discharging plastic material from a cylinder in a plurality of streams, and regulating the speed of said streams relative to one another.

13. The method of forming a confection of the class described, consisting in extruding a stream of plastic material, then imparting a drawing action to the stream, and intermittently obstructing the passage of one surface of the stream as it is being extruded and drawn thereby intermittently to impart a depressing and drawing action on such surface to form V-shaped depressions and rounded protrusions in said surface.

14. The method of forming confections of the class described consisting in nicking certain parts of a stream of plastic material in its passage through an opening, and severing other parts of said stream to form units having a plurality of protrusions.

15. The method of forming confections of the class described consisting in nicking certain parts of a stream of plastic material and serving other parts of said stream to form units having a plurality of protrusions.

16. The method of forming confections of the class described consisting in extruding plastic material from a cylinder by continuous pressure through a plurality of die openings, intermittently closing said die openings to sever said plastic material into units, and relieving the excess pressure in said cylinder while said die openings are being closed.

17. The method of forming a confection of the class described, consisting in extruding a stream of plastic material, then imparting a drawing action to the stream, intermittently obstructing the passage of one surface of the stream as it is being extruded and drawn thereby intermittently to impart a depressing and drawing action on such surface to form V-shaped depressions and rounded protrusions in said surface, and serving said stream into units having a plurality of protrusions.

18. The combination with a machine of the class described, of a cylinder for receiving plastic material, a vertically extending die plate having a plurality of die openings substantially conical in shape, a plurality of hook shaped teeth on the upper inclined edges of said die openings, means for extruding said plastic material through said die openings, and a conveyor for receiving the extruded material and imparting a drawing action thereon to cooperate with the die plate to form an irregular upper contour to the material being treated.

19. The combination with a machine of the class described, of a cylinder for receiving plastic material, a thin vertically extending, metal die plate, there being a plurality of die openings in said die plate substantially conical in shape and having a plurality of hook shaped teeth on the upper inclined edges of said die openings, means for extruding said plastic material through said die openings, and a conveyor for receiving the extruded material and imparting a drawing action thereon, the conveyor, thin die plate and teeth co-operating with the pressure caused by the extruding means to impart a fluffy texture and an irregular upper contour to the plastic material as it extrudes from the die openings.

20. The combination with a machine of the class described, of a cylinder for receiving plastic material, a die plate having a plurality of die openings, means for exercising a pressure on the plastic material to extrude the same through said die openings, a knife reciprocating adjacent to said die plate and closing said die openings to shear the material into units as it extrudes from said cylinder, and means for supporting said knife reciprocating in said cylinder, said supporting means projecting out of said cylinder, when the knife is in closed or severing position thereby relieving the excess pressure caused by the momentary closing of the knife.

21. The combination with a machine of the class described, of a cylinder for receiving plastic material, there being a plurality of die openings, means for extruding said plastic material through said die openings in a plurality of streams, and adjustable means for controlling said streams to discharge through said die openings at approximately equal rates of speed relative to one another.

22. The combination with a machine of the class described, of a cylinder for receiving plastic material, there being a plurality of die openings, means for extruding said plastic material through said die openings in a plurality of streams, and deflectors disposed adjacent to said die openings adjustable to control the streams to discharge through said die openings at approximately equal rates of speed relative to one another.

23. The combination with a machine of the class described, of a cylinder for receiving plastic material, a die, means for extruding plastic material from said cylinder through said die, a knife reciprocably mounted, means for actuating said knife a partial distance to nick said plastic material as it discharges through said die, and means for actuating said knife the full distance to sever said discharging material into units.

24. The combination with a machine of the class described, of a cylinder for receiving plastic material, a die, means for extruding plastic material from said cylinder through said die, a knife mounted to reciprocate adjacent to said die, a cam, and means for connecting said cam with said knife to successively actuate said knife to descend a short distance to nick the plastic material as it extrudes through the die and thus form a plurality of protrusions, and to actuate said knife to descend a full distance to sever the plastic material into units as it extrudes through said die.

25. The combination with a machine of the class described, of a cylinder for receiving plastic material, a die plate having a plurality of die openings, means for extruding the plastic material from said cylinder through said die openings into a plurality of streams, a knife mounted to reciprocate adjacent to said die plate, and means for actuating said knife at one time to descend a short distance to shut off a part of all of the die openings, thereby to nick the material as it extrudes, and at another time to descend the full distance to sever the material into units as it extrudes.

26. The combination with a machine of the class described, of a cylinder for receiving plastic material, a die plate having a plurality of die openings, means for extruding the plastic material from said cylinder through said die openings into a plurality of streams, a knife mounted to reciprocate adjacent to said die plate, means for actuating said knife at one time to descend a short distance to shut off a part of all of the die openings, thereby to nick the material as it extrudes, and at another time to descend the full distance to sever the material into units as it extrudes, the cutting edge of the knife having a face flush with the die plate so that the die plate may serve as a shear and as a scraper to clean the knife as it reciprocates.

27. The combination with a machine of the class described, of a cylinder for receiving plastic material, a die, means for extruding said plastic material through said die, a knife mounted to reciprocate adjacent to said die, and means for actuating said knife at one time to shut off part of said die thereby to nick the plastic material as it extrudes from said die, and at another time to close the die to sever the plastic material into units.

28. The combination with a machine of the class described, of a cylinder for receiving plastic material, a die having a plurality of die openings, means for extruding said plastic material through said die openings, a knife mounted to reciprocate adjacent to said die openings, and means for intermittently actuating said knife to partially shut off said die openings to nick said plastic material as it extrudes, and at another time to shut off the entire die openings to sever the plastic material into units.

29. The combination with a machine of the class described, of a cylinder for receiving plastic material, a die plate having a plurality of die openings, a knife mounted to reciprocate adjacent to said die plate, a cam having a cam track, two shallow short rises in said cam track spaced from one another and a third deeper and longer rise in said cam track and spaced from said shallow rises, and connecting means for connecting said cam track with said knife, the shallow rises actuating said knife to descend a short distance to shut off a part of the die openings, thereby to nick the plastic material as it extrudes, and the deeper rise actuating the knife to descend the full distance to sever the plastic material into units as it extrudes.

30. The combination with a machine of the class described, of a cylinder for receiving plastic material, a die plate having a plurality of die openings, an angle piece secured to the cylinder and forming a facing and reinforcement plate for the die plate, limbs on said angle piece disposed between the die openings of the die plate, a trough plate secured to the bottom of said cylinder, to which is secured said angle piece, a plurality of ribs disposed on the trough plate in alinement with said limbs, and adjustable deflectors secured to said ribs to control the streams to discharge through said die openings at approximately equal rates of speed to one another, the ribs forming reinforcements for said trough and bases for receiving said deflectors.

31. The combination with a machine of the class described, of means for feeding plastic material, a knife reciprocally mounted, and means for actuating said knife at one time to descend a short distance to nick the plastic material to form protrusions, and at another time to descend the full distance to sever the plastic material into units having protrusions.

32. The combination with a machine of the class described, of means for feeding plastic material, a knife reciprocably mounted, a conveyor for receiving and advancing the material from the knife, and means for actuating said knife to descend a short distance, the conveyor cooperating with the knife to impart a drawing action on the material while the knife engages the same thereby to form V-shaped depressions and rounded protrusions.

33. The combination with a machine of the class described, of means for feeding plastic material, a knife reciprocably mounted, a conveyor for receiving and advancing the material from the knife, and means for actuating said knife at one time to descend a short distance to nick the plastic material and at another time to descend the full distance to sever the plastic material into units, the conveyor cooperating with the knife to impart a drawing action on the material while the knife engages the same thereby to form units having a plurality of successive rounded protrusions.

34. The combination with a machine of the class described, of means for feeding plastic material, a knife reciprocably mounted, a conveyor for receiving and advancing the material from the knife, cam means for actuating said knife at one time to descend a short distance to nick the plastic material, and other cam means for actuating said knife at another time to descend the full distance to sever the plastic material into units, the conveyor cooperating with the knife to impart a drawing action on the material while the knife engages the same thereby to form units having a plurality of successive rounded protrusions.

SIMON COOPER.